United States Patent
Pan et al.

(10) Patent No.: US 10,090,689 B2
(45) Date of Patent: Oct. 2, 2018

(54) OVERCURRENT PROTECTION CIRCUIT AND METHOD FOR LIMITING DISCHARGE CURRENT OF BATTERY WITHIN SAFETY LIMITING VALUE

(71) Applicant: HYTERA COMMUNICATIONS CORP., LTD., Shenzhen, Guangdong (CN)

(72) Inventors: Qihui Pan, Guangdong (CN); Liangfei Lu, Guangdong (CN); Kok Hoong Yu, Guangdong (CN); Yunyuan Xiong, Guangdong (CN)

(73) Assignee: Hytera Communications Corp., Ltd., Guangdong (CN)

( * ) Notice: Subject to any disclaimer, the term of this patent is extended or adjusted under 35 U.S.C. 154(b) by 179 days.

(21) Appl. No.: 15/103,930

(22) PCT Filed: Dec. 13, 2013

(86) PCT No.: PCT/CN2013/089386
§ 371 (c)(1),
(2) Date: Aug. 30, 2016

(87) PCT Pub. No.: WO2015/085578
PCT Pub. Date: Jun. 18, 2015

(65) Prior Publication Data
US 2016/0380451 A1    Dec. 29, 2016

(51) Int. Cl.
*H01M 10/44* (2006.01)
*H01M 10/46* (2006.01)
(Continued)

(52) U.S. Cl.
CPC .......... *H02J 7/0029* (2013.01); *H02H 3/093* (2013.01); *H02H 7/18* (2013.01); *H02J 7/0063* (2013.01);
(Continued)

(58) Field of Classification Search
CPC . H02J 7/0034; H02J 7/0036; H02J 2007/0039
(Continued)

(56) References Cited

U.S. PATENT DOCUMENTS 6,504,345 B2    1/2003   Sakurai et al.
7,629,769 B2 *  12/2009  Gangstoe .............. H02J 7/0031
                                              320/112
(Continued)

FOREIGN PATENT DOCUMENTS

CN    1518183 A    8/2004
CN    2938522 Y    8/2007
(Continued)

OTHER PUBLICATIONS

International Search Report for corresponding International Application No. PCT/CN2013/089386 dated Sep. 26, 2014.
(Continued)

*Primary Examiner* — Edward Tso
(74) *Attorney, Agent, or Firm* — Renner, Otto, Boisselle & Sklar, LLP

(57) ABSTRACT

An overcurrent protection circuit and method for battery discharge. The overcurrent protection circuit includes a discharge switch tube; a discharge control module which is used for detecting the discharge current of batteries in real time, and judging whether an overcurrent is generated by way of comparing the detected discharge current with a preset limiting value, the discharge control module controlling switch-on of the discharge switch tube if no overcurrent is generated, the discharge control module controlling switch-off of the discharge switch tube if an overcurrent is generated, and the discharge control module locking the discharge switch tube in a switch-off state when the overcurrent has timed out; and a time delay module which is used for judging whether the overcurrent has timed out by way of
(Continued)

comparing the time when the overcurrent is generated with a preset delay time.

12 Claims, 5 Drawing Sheets

(51) Int. Cl.
*H02J 7/00* (2006.01)
*H02H 7/18* (2006.01)
*H02H 3/093* (2006.01)

(52) U.S. Cl.
CPC . *H02J 2007/004* (2013.01); *H02J 2007/0039* (2013.01); *H02J 2007/0067* (2013.01)

(58) Field of Classification Search
USPC .................. 320/107, 131, 134, 135, 136
See application file for complete search history.

(56) References Cited

U.S. PATENT DOCUMENTS

| | | | |
|---|---|---|---|
| 8,587,284 | B2 | 11/2013 | Djenguerian et al. |
| 8,803,481 | B2 | 8/2014 | Tachikawa et al. |
| 2002/0027758 | A1* | 3/2002 | Oglesbee .............. G05F 1/565 361/104 |
| 2002/0079869 | A1 | 6/2002 | Fujiwara |
| 2007/0210758 | A1 | 9/2007 | Gangstoe et al. |

FOREIGN PATENT DOCUMENTS

| | | |
|---|---|---|
| CN | 100394670 C | 6/2008 |
| CN | 101764388 A | 6/2010 |
| CN | 101777782 A | 7/2010 |
| CN | 102098032 A | 6/2011 |
| CN | 202026077 U | 11/2011 |
| CN | 103647323 A | 3/2014 |
| CN | 203839985 U | 9/2014 |
| JP | H0956056 A | 2/1997 |

OTHER PUBLICATIONS

Office Action issued in co-pending Chinese Application No. 201310688242.X dated Oct. 19, 2015.
Office Action issued in corresponding Chinese Application No. 201310688242.X dated Apr. 8, 2015.
Extended European Search Report issued in corresponding European Application No. 13899182.3 dated Aug. 18, 2017.

* cited by examiner

OVERCURRENT PROTECTION CIRCUIT AND METHOD FOR LIMITING DISCHARGE CURRENT OF BATTERY WITHIN SAFETY LIMITING VALUE

This application is a national phase of International Application No. PCT/CN2013/089386 filed Dec. 13, 2013.

TECHNICAL FIELD

The present disclosure relates to the field of battery protection, and more particularly, to an overcurrent protection circuit and method for battery discharge.

BACKGROUND

As to the electronic equipment powered by a battery, after replacing the battery many times, a pole patch of the battery becomes black, which results in an unreliable power supply of the electronic equipment. The main reason is that the discharge current of the battery is not reasonably controlled. For example, when replacing the battery for the electronic equipment, a large pulse current occurs at the moment of contacting the battery pole patch with a battery holder of the electronic equipment, and there is spark generation at the contact point of the battery pole patch, and the battery pole patch is oxidized by high-temperature, thereby the pole patch of the battery turns black. In the handhold electronic equipment applied in some flammable and explosive environment, for sake of safety, the discharge energy of the battery needs to be restricted within a certain safety value. The large transient discharge current of the battery brings a lot of potential safety hazard to the storage and usage of the battery. Thereby, how to reasonably restrict the battery discharge current within the safety limiting value without affecting its normal usage is an important technical problem to be solved for battery protection.

At present, the overcurrent protection circuit for battery discharge mainly adopts the following manner: when the battery is in an idle state, a discharge switch transistor is normally switched on; during the battery discharging, when the protection circuit detects that the discharge current of the battery exceeds a designed limiting value, the discharge switch transistor will be switched off after a certain delay time, and the battery discharge is ended; during the switch-off delay time, the discharge switch transistor is continuously switched on, and there is large pulse current through the discharge circuit. The deficiency of this method is that the usage safety of the battery conflicts with the requirement to the delay time by the charge of capacitive load. If the delay time is designed to be relatively short, the switch-off delay time is required to be relatively long when supplying power to the load containing a large capacitor; and if the delay time is not long enough, before the capacitor of the load is fully charged, the battery protection circuit generates a current limiting protection and terminates the discharge, then the load cannot be powered normally. If the delay time is designed to be relatively long, the charge requirement of the load having a large capacitance is satisfied, but if the discharge port of the battery is short-circuited suddenly, a large pulse current will be generated, and there may be a hidden danger of accidents such as fire or burns. Using such battery, the pole patch of the battery of the equipment is usually oxidized and turns black, and then a poor contact occurs.

SUMMARY

Aiming at the deficiency in the related art that the discharge current of the battery cannot be restricted within the safety limiting value, the technical problem to be solved by the present disclosure is to provide an overcurrent protection circuit and method for battery discharge, which can properly limit the discharge current of the battery within the safety limiting value.

The technical solution adopted for solving the technical problem by the present disclosure is to configure an overcurrent protection circuit for battery discharge including a discharge switch transistor connected in a battery discharge path, wherein the overcurrent protection circuit further includes:

a discharge control module configured to detect a discharge current of a battery in real time, and determine whether an overcurrent occurs by comparing the detected discharge current with a preset limiting value, wherein if no overcurrent occurs, the discharge control module controls the discharge switch transistor to be switched on; and if the overcurrent occurs, the discharge control module controls the discharge switch transistor to be switched off, and when the overcurrent has timed out, the discharge control module locks the discharge switch transistor in the switch-off state; and a time delay module configured to determine whether the overcurrent has timed out by comparing the time of the overcurrent with a preset delay time.

In the overcurrent protection circuit for battery discharge of the present disclosure, the discharge control module includes a battery protection chip, a sampling resistor, a comparator, and a current limit control switch transistor, wherein a first terminal of the sampling resistor is connected to a negative electrode of the battery and a ground, a second terminal of the sampling resistor is connected to a second terminal of the discharge switch transistor and a first input terminal of the comparator, a first terminal of the discharge switch transistor is connected to a negative electrode of a discharge port, a second input terminal of the comparator is connected to a reference voltage, an output terminal of the comparator is connected to a control terminal of the current limit control switch transistor, a second terminal of the current limit control switch transistor is connected to the ground, and a first terminal of the current limit control switch transistor is connected to a control terminal of the discharge switch transistor and a discharge control terminal of the battery protection chip.

In the overcurrent protection circuit for battery discharge of the present disclosure, the discharge control module includes a battery protection chip, a sampling resistor, a comparator, an amplifier, and a current limit control switch transistor, wherein a first terminal of the sampling resistor is connected to a positive electrode of the battery and a first input terminal of the amplifier, a second terminal of the sampling resistor is connected to a positive electrode of a discharge port and a second input terminal of the amplifier, an output terminal of the amplifier is connected to a first input terminal of the comparator, a second input terminal of the comparator is connected to a reference voltage, an output terminal of the comparator is connected to a control terminal of the current limit control switch transistor, a second terminal of the current limit control switch transistor is connected to the ground, a first terminal of the current limit control switch transistor is connected to a control terminal of the discharge switch transistor and a discharge control terminal of the battery protection chip, a first terminal of the discharge switch transistor is connected to a negative electrode of the discharge port, and a second terminal of the discharge switch transistor is connected to a negative electrode of the battery and the ground.

In the overcurrent protection circuit for battery discharge of the present disclosure, the discharge control module further includes a current limit resistor, a first terminal of the current limit resistor is connected to the discharge control terminal of the battery protection chip, and a second terminal of the current limit resistor is connected to the control terminal of the discharge switch transistor and the first terminal of the current limit control switch transistor.

In the overcurrent protection circuit for battery discharge of the present disclosure, the time delay module includes a first diode, a first switch transistor, a second switch transistor, a first capacitor, a first resistor, a second resistor, a third resistor and a fourth resistor, wherein a first terminal of the first switch transistor is connected to a voltage sampling terminal of the battery protection chip, a second terminal of the first switch transistor and a second terminal of the second switch transistor are connected to the ground, a control terminal of the first switch transistor and a first terminal of the second switch transistor are connected to the negative electrode of the discharge port via the first resistor, a positive electrode of the first diode is connected to the negative electrode of the discharge port, a negative electrode of the first diode is connected to a first terminal of the first capacitor and a control terminal of the second switch transistor via the second resistor, a second terminal of the first capacitor is connected to the ground, the negative electrode of the discharge port is further connected to the voltage sampling terminal of the battery protection chip via the third resistor, and the fourth resistor is connected between the negative electrode of the first diode and the ground.

In the overcurrent protection circuit for battery discharge of the present disclosure, the discharge control module includes a battery protection chip, a sampling resistor, a current limit control switch transistor, a fifth resistor, a sixth resistor, a second capacitor and a second diode, wherein a first terminal of the sampling resistor is connected to a negative electrode of the battery and a ground, a second terminal of the sampling resistor is connected to a second terminal of the discharge switch transistor and a second terminal of the current limit control switch transistor, a first terminal of the discharge switch transistor is connected to a negative electrode of a discharge port, a control terminal of the discharge switch transistor is connected to a positive electrode of the second diode, a negative electrode of the second diode is connected to a discharge control terminal of the battery protection chip, the sixth resistor is connected between the positive electrode and the negative electrode of the second diode, a first terminal of the current limit control switch transistor is connected to a voltage sampling terminal of the battery protection chip, a first terminal of the fifth resistor is connected to a discharge control terminal of the battery protection chip, a second terminal of the fifth resistor is connected to a control terminal of the current limit control switch transistor and a first terminal of the second capacitor, and a second terminal of the second capacitor is connected to the ground.

In the overcurrent protection circuit for battery discharge of the present disclosure, the time delay module includes a first diode, a second resistor, a third resistor, a fourth resistor, a first capacitor, and a second switch transistor, wherein a positive electrode of the first diode is connected to a negative electrode of the discharge port, a negative electrode of the first diode is connected to a first terminal of the first capacitor and a control terminal of the second switch transistor via the second resistor, a second terminal of the first capacitor and a second terminal of the second switch transistor are connected to the ground, a first terminal of the second switch transistor is connected to the control terminal of the current limit control switch transistor, the negative electrode of the discharge port is further connected to the voltage sampling terminal of the battery protection chip via the third resistor, and the fourth resistor is connected between the negative electrode of the first diode and the ground.

In the overcurrent protection circuit for battery discharge of the present disclosure, the discharge control module further includes a third diode and a seventh resistor, wherein a negative electrode of the third diode is connected to the control terminal of the current limit control switch transistor, and a positive electrode of the third diode is connected to the negative electrode of the discharge port via the seventh resistor.

The present disclosure also configures an overcurrent protection method for battery discharge, applied for controlling a discharge switch transistor connected in a battery discharge path, wherein when a load is connected in the battery, the method includes:

A. detecting a discharge current of the battery in real time, and determining whether an overcurrent occurs by comparing the detected discharge current and a preset limiting value; if the overcurrent does not occur, performing step B; and if the overcurrent occurs, performing step C;

B. controlling the discharge switch transistor to be switched on, and then performing step A;

C. controlling the discharge switch transistor to be switched off, and determining whether the overcurrent has timed out by comparing the time of overcurrent and a preset delay time; if the overcurrent has timed out, performing step D; and if the overcurrent has not timed out, performing step A; and D. locking the discharge switch transistor in a switch-off state, and then ending process.

In the overcurrent protection method for battery discharge of the present disclosure, the determining whether the overcurrent has timed out by comparing the time of overcurrent and the preset delay time includes:

when the discharge switch transistor is switched off, charging a first capacitor via a second resistor by a high voltage, and determining whether the overcurrent has timed out according to the voltage of the first capacitor, wherein the preset delay time is relevant to a resistance value of the second resistor and a capacitive value of the first capacitor.

BRIEF DESCRIPTION OF THE DRAWINGS

Hereinafter, further explanations of the present disclosure are given in combination with the drawings and embodiments.

DETAILED DESCRIPTION

Figure 1:
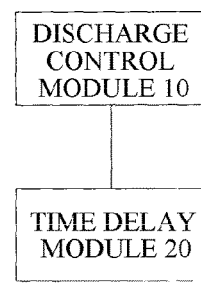
FIG. 1 is a logic diagram illustrating a first embodiment of an overcurrent protection circuit for battery discharge according to the present disclosure.

FIG. 1 is a logic diagram illustrating a first embodiment of an overcurrent protection circuit for battery discharge according to the present disclosure. The overcurrent protection circuit for battery discharge includes a discharge switch transistor (not shown in the drawing), a discharge control module 10 and a time delay module 20, wherein the discharge switch transistor is connected in a battery discharge path. The discharge control module 10 is used for detecting a discharge current of a battery in real time, and determining whether an overcurrent occurs by comparing the detected discharge current with a preset limiting value. If no overcurrent occurs, the discharge control module 10 controls the discharge switch transistor to be switched on; and if the overcurrent occurs, the discharge control module 10 controls the discharge switch transistor to be switched off. Meanwhile, when the overcurrent has timed out, the discharge control module 10 locks the discharge switch transistor in a switch-off state. The time delay module 20 is used for determining whether the overcurrent has timed out by comparing the time of the overcurrent with a preset delay time.

Figure 2:
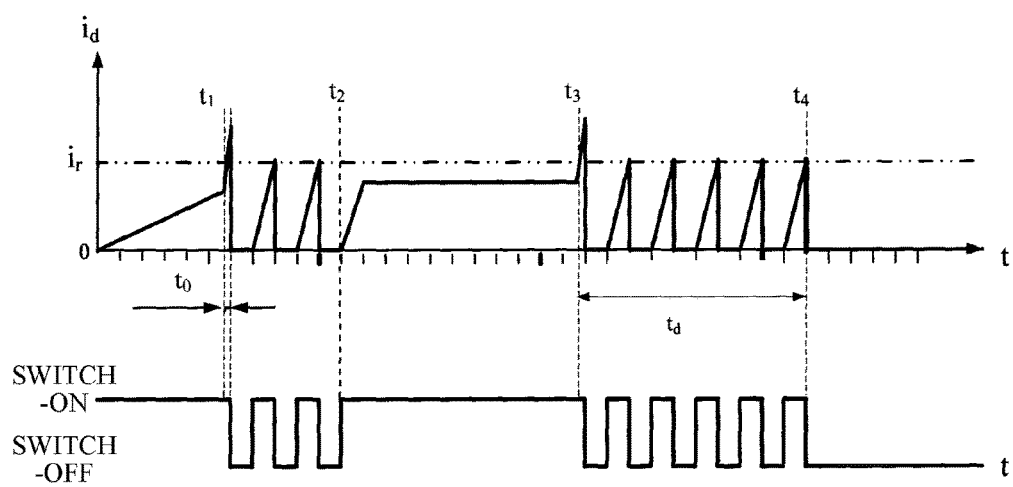
FIG. 2 is a sequence diagram of the discharge current and the state of the discharge switch transistor with loading time in FIG. 1.

In combination with FIG. 2, after a load is connected in the battery, a discharge current $i_d$ of the battery begins to be detected so as to determine whether an overcurrent occurs, i.e., whether the discharge current $i_d$ exceeds a current limiting value $i_r$. If no overcurrent occurs, the discharge switch transistor is controlled to be switched on; and if the overcurrent occurs, the discharge switch transistor is controlled to be switched off. Meanwhile, the time of the overcurrent and a preset delay time are compared to determine whether the overcurrent has timed out, and if the overcurrent has timed out, the discharge switch transistor is locked in the switch-off state. For example, if the overcurrent occurs at moment $t_1$ and ends at moment $t_2$, and the overcurrent has not timed out, i.e., the time during which the overcurrent occurs (time period of $t_2-t_1$) does not exceed the delay time, then in the period of discharge overcurrent, the discharge control module 10 controls the discharge switch transistor to operate in a manner of being switched-on discontinuously, and after the end of the discharge overcurrent, the discharge control module 10 controls the discharge switch transistor to be switched on continuously. It should be noted herein that when controlling the action of the discharge switch transistor, a response time $t_0$ shall be considered.

For another example, if the overcurrent occurs at moment $t_3$ during the discharge of the battery, and does not terminate at moment $t_4$, i.e., the time during which the overcurrent occurs (time period of $t_4-t_3$) reaches the delay time $t_d$, then within the delay time $t_d$, the discharge control module 10 controls the discharge switch transistor to operate in a manner of being switched on discontinuously, and when the delay time ends, i.e., after moment $t_4$, the discharge control module 10 locks the discharge switch transistor in the switch-off state.

The technical solution of this embodiment is implemented as follows: after the load is connected in the battery, when an overcurrent occurs, if the overcurrent has not timed out, then the discharge switch transistor operates in a manner of being switched on discontinously during the overcurrent, and continues to be switched on after the overcurrent ends; and if the overcurrent has timed out, the discharge switch transisitor operates in a manner of being siwtched on discontinuously during the delay time, and is locked in the switch-off state after the delay time ends. Thereby, when charging the capacitive load by the battery, the charge is not completed at a time, but is accumulated several times. Thus, transient current of the battery discharge can be reduced, transient energy of the battery discharge is efficiently limited, and safety of the battery is improved.

Figure 3:
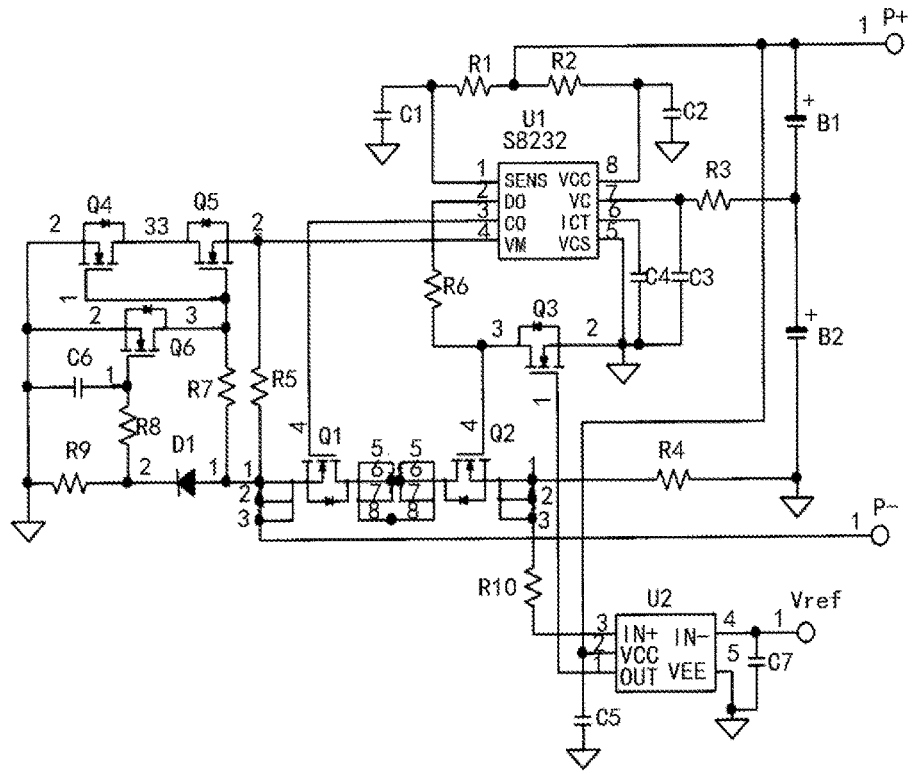
FIG. 3 is a circuit diagram of a second embodiment of the overcurrent protection circuit for battery discharge according to the present disclosure.

FIG. 3 is a circuit diagram of a second embodiment of the overcurrent protection circuit for battery discharge according to the present disclosure. The battery includes battery cells B1 and B2 connected in series. A positive electrode of the battery cell B1 is a positive electrode of the battery, and a negative electrode of the battery cell B2 is the negative electrode of the battery. The negative electrode of the battery is grounded. The overcurrent protection circuit for the battery discharge includes a discharge switch transistor, a discharge control module and a time delay module. In addition, the battery is a rechargeable battery, and the overcurrent protection circuit further includes a charge switch transistor. Furthermore, in this embodiment, a MOS transistor Q2 is chosen as the discharge switch transistor, and a MOS transistor Q1 is chosen as the charge switch transistor. In other embodiments, if the battery is a non-rechargable battery, the charge switch transistor may be omitted. Hereinafter, the discharge control module and the time delay module will be explained in detail respectively.

In the discharge control module, a chip with a model number S8232 may be chosen as the battery protection chip U1. Moreover, the battery protection chip U1 has several ports DO, CO, ICT, VM, VC, SENS, and VCC. DO is a discharge control terminal for controlling the MOS transistor Q2. CO is a charge control terminal for controlling the MOS transistor Q1. ICT is a timing capacitor connecting terminal, the timing capacitor is a capacitor C4, and a response time for charge-discharge detection may be adjusted by varying a capacitance of the capacitor C4. VM is a voltage sampling terminal, an input voltage of VM is compared with a reference voltage (such as 0.3V) set internally, and the comparison result is used for controlling a limitation of the current. VC and SENS are voltage detection terminals of the battery cells of the battery, wherein VC is connected to the positive electrode of the battery cell B2 via a resistor R3, and SENS is connected to the positive electrode of the battery cell B1 via a resistor R1. VCC is a power supply terminal of the IC inner circuits, and is connected to the positive electrode of the battery cell B1 via a resistor R2. In addition, VCC, VC, and SENS ports are grounded via capacitors C2, C3 and C1 respectively. These capacitors provide functions of voltage stabilization and filtering, and may be omitted in other embodiments.

During operation, if the state is normal, i.e., neither charge overcurrent nor discharge overcurrent occurs, both the discharge control terminal (DO) and the charge control terminal (CO) of the battery protection chip U1 output a high voltage to control the MOS transistor Q1 and the MOS transistor Q2 to be switched on, so as to form a charge path or a discharge path. During discharging, if the voltage of the battery cell is lower than a discharge limiting voltage or the discharge current exceeds the limiting current, the discharge control terminal (DO) of the battery protection chip U1 outputs a low voltage to control the MOS transistor Q2 to be switched off, and thus the battery stops discharge. During charging, if the voltage of the battery cell exceeds the charge limiting voltage, the charge control terminal (CO) of the battery protection chip U1 outputs a low voltage to control the MOS transistor Q1 to be switched off, and the charge to the battery stops.

In the discharge control module, a first terminal of the sampling resistor R4 is connected to the negative electrode of the battery cell B2, a second terminal of the sampling resistor R4 is connected to a source electrode of the MOS transistor Q2, the second terminal of the sampling resistor R4 is also connected to a first input terminal (IN+) of a comparator U2 via a resistor R10, a second input terminal (IN−) of the comparator U2 is connected to a reference voltage Verf, a drain electrode of the MOS transistor Q2 is connected to a drain electrode of the MOS transistor Q1, a source electrode of the MOS transistor Q1 is connected to a negative electrode P− of a discharge port, a gate electrode of the MOS transistor Q2 is connected to the discharge control terminal (DO) of the battery protection chip U1 via a resistor R6, and a gate electrode of the MOS transistor Q1 is connected to the charge control terminal (CO) of the battery protection chip U1. An output terminal of the comparator U2 is connected to a gate electrode of a MOS transistor Q3, a source electrode of the MOS transistor Q3 is grounded, and a drain electrode of the MOS transistor Q3 is connected to the gate electrode of the MOS transistor Q2. In addition, a capacitor C7 is connected between the second input terminal (IN−) of the comparator U2 and the ground, a power supply terminal (VCC) of the comparator U2 is connected to the positive electrode of the battery cell B1. Moreover, a capacitor C5 is connected between the power supply terminal (VCC) of the comparator U2 and the ground. It should be explained herein that the reference voltage of the comparator U2 may be provided by a regulator chip, or may be provided by other reference voltage source(s). In addition, in this embodiment, the capacitors C3, C2, C1, C7 and C5 provide functions of voltage stabilization and filtering, the resistors R10 and R6 has the function of current limiting, and these capacitors and resistors may be omitted in other embodiments.

In the time delay module, a source electrode of a MOS transistor Q5 is connected to the voltage sampling terminal (VM) of the battery protection chip U1, a drain electrode of the MOS transistor Q5 is connected to a drain electrode of a MOS transistor Q4, a source electrode of the MOS transistor Q4 and a source electrode of a MOS transistor Q6 are grounded, a gate electrode of the MOS transistor Q5, a gate electrode of the MOS transistor Q4, and a drain electrode of the MOS transistor Q6 are connected together, and connected to the negative electrode P− of the discharge port via a resistor R7. A positive electrode of a diode D1 is connected to the negative electrode P− of the discharge port, a negative electrode of the diode D1 is connected to a first terminal of a capacitor C6 and a gate electrode of the MOS transistor Q6 via a resistor R8, a second terminal of the capacitor C6 is grounded, and the negative electrode P− of the discharge port is also connected to the voltage sampling terminal (VM) of the battery protection chip U1 via a resistor R5. In addition, a resistor R9 is further connected between the negative electrode of the diode D1 and the ground, and the resistor R9 provides a discharge path for the capacitor C6. Furthermore, in this embodiment, both the MOS transistors Q4 and Q5 are anti-paralleled (in inverse parallel connection) with a diode, and in order to prevent bidirectional conduction, the MOS transistors Q4 and Q5 are connected in series as described above. If using a MOS transistor without the anti-paralleled diode, the MOS transistors Q4 and Q5 connected in series may be replaced by one MOS transistor.

Hereinafter, the working procedure of the overcurrent protection circuit for battery discharge according to this embodiment will be described: after a load is connected in the discharge port, both the charge control terminal (CO) and the discharge control terminal (DO) of the battery protection chip U1 output a high level, and the MOS transistors Q1 and Q2 are switched on. In a normal state, i.e., no discharge overcurrent occurs, the voltage at the sampling resistor R4 is lower than the reference voltage of the comparator U2, the output terminal (OUT) of the comparator U2 outputs a low level, the MOS transistor Q3 is switched off, and the MOS transistor Q2 is switched on due to that the gate voltage thereof is drawn high by the high voltage at the discharge control terminal (DO) of the battery protection chip U1. At this time, the output voltage of the battery cell of the battery forms a discharge path via the discharge port, and the MOS transistors Q1 and Q2.

When the discharge overcurrent occurs, the voltage at the sampling resistor R4 is greater than the reference voltage of the comparator U2, the output terminal (OUT) of the comparator U2 outputs a high level, the MOS transistor Q3 is switched on, the MOS transistor Q2 is switched off due to that the gate voltage thereof is drawn low by the MOS transistor Q3, and the discharge path is disconnected. After the MOS transistor Q2 is switched off, the voltage at the sampling resistor R4 decreases, and when the voltage is lower than the reference voltage of the comparator U2, the comparator U2 outputs the low level again, the MOS transistor Q3 is switched off again, the MOS transistor Q2 is switched on due to that the gate voltage thereof is drawn high by the high voltage at the discharge control terminal (DO) of the battery protection chip U1, and the discharge path is on again. In this way, the MOS transistor Q2 operates in the state of being switched on discontinuously.

In addition, during the switch-off of the MOS transistor Q2 after the discharge overcurrent of the battery, the voltage of the negative electrode P− of the discharge port is drawn high, and controls the MOS transistors Q4 and Q5 to be switched on via the resistor R7, such that the voltage sampling terminal (VM) of the battery protection chip U1 is grounded. Meanwhile, the high voltage of the negative electrode P− of the discharge port charges the capacitor C6 via the diode D1 and the resistor R8. Since the MOS transistor Q2 is switched off discontinuously during the overcurrent, the charge to the capacitor C6 is accumulated several times.

As the increase of the voltage of the capacitor C6, before the voltage reaches the conduction limiting voltage of the MOS transistor Q6, the MOS transistor Q2 operates in the state of being switched off discontinuously. If the voltage of the capacitor C6 reaches the conduction limiting voltage of the MOS transistor Q6, the MOS transistor Q6 is switched on, and the MOS transistors Q4 and Q5 are switched off due to that their gate voltages are drawn low. Meanwhile, the resistor R5 couples the high voltage of the negative electrode P− of the discharge port with the voltage sampling terminal (VM) of the battery protection chip U1. When the voltage is greater than an internal reference voltage (0.3V), the discharge control terminal (DO) of the battery protection chip U1 outputs a low level, and the MOS transistor Q2 is switched off due to that its gate electrode loses voltage. After that, the voltage of the negative electrode P− of the discharge port is continuously applied to the voltage sampling terminal (VM) of the battery protection chip U1 via the resistor R5, such that the discharge control terminal (DO) of the battery protection chip U1 continously outputs a low voltage, the MOS transistor Q2 is locked in the switch-off state, and the discharge path of the battery is locked in the disconnected state.

In addition, it should be explained that before the charge voltage on the capacitor C6 reaches the gate limiting voltage of the MOS transistor Q6, since the MOS transistors Q4 and Q5 are in the switch-on state, the high voltage of the negative electrode P− of the discharge port cannot be applied to the voltage sampling terminal (VM) of the battery protection chip U1, the discharge control terminal (DO) of the battery protection chip U1 is continously in a high voltage, the MOS transistor Q2 operates in the state of discontinous switch-on under control of the MOS transistor Q3, the waveform of the overcurrent is a series of pulses, and an amplitude of a first pulse is higher than that of the subsequent pulses.

After the MOS transistor Q2 is locked in the switch-off state, only if the load connected in the discharge port is removed, the voltage of the negative electrode P− of the discharge port decreases. If the voltage of the voltage sampling terminal (VM) of the battery protection chip U1 reduces below the internal reference voltage (0.3V), the discharge control terminal (DO) of the battery protection chip U1 outputs a high voltage, the MOS transistor Q2 is switched on again since the gate electrode thereof is applied with a high voltage, and the discharge path restores to be conducted. In addition, the switch-on speed of the MOS transistor Q2 may be decreased by connecting the resistor R6 in series with the gate electrode of the MOS transistor Q2, so as to further decrease the transient peak current of battery discharge.

Figure 4:
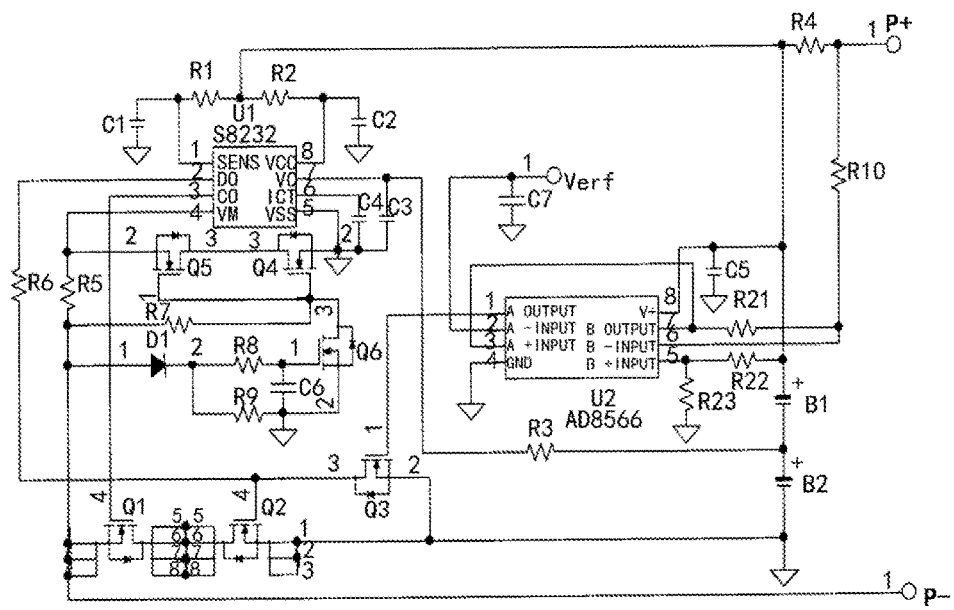
FIG. 4 is a circuit diagram of a third embodiment of the overcurrent protection circuit for battery discharge according to the present disclosure.

FIG. 4 is a circuit diagram of a third embodiment of the overcurrent protection circuit for battery discharge according to the present disclosure. Compared with the embodiment shown in FIG. 3, the circuit structures of the time delay module are the same, and the difference only lies in the discharge control module. Hereinafter, only the circuit structure of the discharge control module in the present embodiment is described. In the discharge control module, a chip with a model number AD8566 is selected as an operational amplifier U2. This chip includes two parts, the first part functions as an amplifier for amplifying the sampling voltage on the sampling resistor R4, and the second part functions as a comparator for comparing the sampling voltage and the reference voltage. In other embodiments, separate amplifier and comparator may be selected. In addition, in this embodiment, the sampling resistor R4 is connected between the positive electrode P+ of the discharge port and the positive electrode of the battery cell B1. Moreover, the first terminal of the sampling resistor R4 is connected to a first input terminal (B−INPUT) of the first part of the operational amplifier U2 via a resistor R10, a second terminal of the sampling resistor R4 is connected to a second input terminal (B+INPUT) of the first part of the operational amplifier U2 via a resistor R22, a resistor R23 is connected between the second input terminal (B+INPUT) of the first part of the operational amplifier U2 and the ground, an output terminal (B OUTPUT) of the first part of the operational amplifier U2 is connected to a first input terminal (A+INPUT) of the second part of the operational amplifier U2, a second input terminal (A−INPUT) of the second part of the operational amplifier U2 is connected to the reference voltage Verf, an output terminal (A OUTPUT) of the second part of the operational amplifier U2 is connected to the gate electrode of the MOS transistor Q3, a source electrode of the MOS transistor Q3 is grounded, a drain electrode of the MOS transistor Q3 is connected to a gate electrode of the MOS transistor Q2, a drain electrode of the MOS transistor Q2 is connected to a drain electrode of the MOS transistor Q1, a source electrode of the MOS transistor Q1 is connected to the negative electrode P− of the discharge port, a gate electrode of the MOS transistor Q2 is connected to the discharge control terminal (DO) of the battery protection chip U1 via a resistor R6, and the gate electrode of the MOS transistor Q1 is connected to the charge control terminal (CO) of the battery protection chip U1. In addition, a capacitor C7 is further connected between the second input terminal (A−INPUT) of the second part of the operational amplifier U2 and the ground, and a power supply terminal (V+) of the operational amplifier U2 is connected to the positive electrode of the battery cell B1. Moreover, a capacitor C5 is further connected between the power supply terminal (V+) of the operational amplifier U2 and the ground.

The working procedure of the overcurrent protection circuit for battery discharge in this embodiment is substantially the same as that in the second embodiment shown in FIG. 3. The only difference lies in that in the present embodiment, the sampling resistor R4 is connected to the positive electrode of the discharge port, and one amplifier is used to acquire the voltage on the sampling resistor R4, such that the anti-interference capability may be improved. The reasons are particularly as follows: if the sampling resistor is provided at the negative electrode of the discharge port, since the negative electrode of the discharge port is generally connected with a grounded case of the host directly, the ability of anti-interference is relatively poor.

Figure 5:
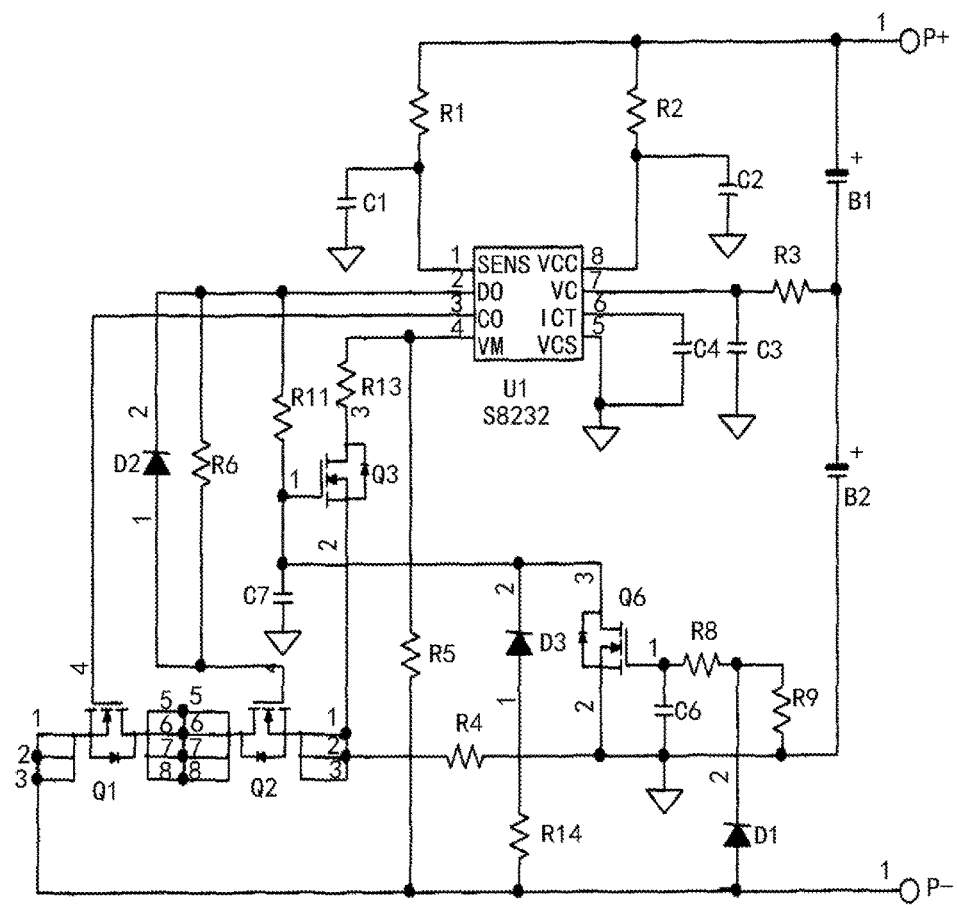
FIG. 5 is a circuit diagram of a fourth embodiment of the overcurrent protection circuit for battery discharge according to the present disclosure.

FIG. 5 is a circuit diagram of a fourth embodiment of the overcurrent protection circuit for battery discharge according to the present disclosure. Hereinafter, the structure of the discharge control module and the time delay module in this embodiment will be described in detail.

In the discharge control module, the first terminal of the sampling resistor R4 is connected to the negative electrode of the battery cell B2, a second terminal of the sampling resistor R4 is connected to a source electrode of the MOS transistor Q2, the second terminal of the sampling resistor R4 is also connected to a source electrode of the MOS transistor Q3, a drain electrode of the MOS transistor Q2 is connected to a drain electrode of the MOS transistor Q1, a source electrode of the MOS transistor Q1 is connected to a negative electrode P− of the discharge port, a gate electrode of the MOS transistor Q1 is connected to the charge control terminal (CO) of the battery protection chip U1, a gate electrode of the MOS transistor Q2 is connected to a positive electrode of the diode D2, a negative electrode of the diode D2 is connected to the discharge control terminal (DO) of the battery protection chip U1, the drain electrode of the MOS transistor Q3 is connected to the voltage sampling terminal (VM) of the battery protection chip U1 via a resistor R13, a first terminal of the resistor R11 is connected to the discharge control terminal (DO) of the battery protection chip U1, a second terminal of the resistor R11 is connected to the gate electrode of the MOS transistor Q3 and a first terminal of a capacitor C7, and a second terminal of the capacitor C7 is grounded. In addition, the resistor R6 is connected between the discharge control terminal (DO) of the battery protection chip U1 and the gate electrode of the MOS transistor Q2, so as to decrease the switch-on speed of the transistor Q2 to reduce the transient current of battery discharge. The positive electrode of the diode D3 is grounded via the resistor R14, and the negative electrode of the diode D3 is connected to the gate electrode of the MOS transistor Q3.

In the time delay module, the positive electrode of the diode D1 is connected to the negative electrode P− of the discharge port, the negative electrode of the diode D1 is connected to the first terminal of the capacitor C6 and the gate electrode of the MOS transistor Q6 via the resistor R8, the second terminal of the capacitor C6 and the source electrode of the MOS transistor Q6 are grounded, the drain electrode of the MOS transistor Q6 is connected to the gate electrode of the MOS transistor Q3, the negative electrode P− of the discharge port is also connected to the voltage sampling terminal (VM) of the battery protection chip U1 via the resistor R5, and the resistor R9 is connected between the negative electrode of the diode D1 and the ground for providing a discharge path to the capacitor C6.

Hereinafter, the working procedure of the overcurrent protection circuit for battery discharge according to this embodiment will be described: after the load is connected in the discharge port, both the charge control terminal (CO) and the discharge control terminal (DO) of the battery protection chip U1 output a high level, and the MOS transistors Q1 and Q2 are switched on. At this time, the output voltage of the battery cells of the battery forms a discharge path via the discharge port, and the MOS transistors Q1 and Q2. In a normal state, i.e., no discharge overcurrent occurs, when the discharge control terminal (DO) of the battery protection chip U1 outputs a high voltage, the capacitor C7 is charged by the resistor R11 such that the voltage of the capacitor C7 is higher than the gate conduction voltage of the MOS transistor Q3, the MOS transistor Q3 is switched on, the voltage on the sampling resistor R4 is coupled to the voltage sampling terminal (VM) of the battery protection chip U1 via the MOS transistor Q3 and the resistor R13. If the voltage is lower than an internal reference voltage (0.3V) of the battery protection chip U1, the discharge control terminal (DO) of the battery protection chip U1 continuously outputs the high level, and the discharge path is maintained.

When the overcurrent occurs, the voltage at the sampling resistor R4 is greater than the internal reference voltage (0.3V) of the battery protection chip U1, the discharge control terminal (DO) of the battery protection chip U1 outputs a low level, the MOS transistor Q2 is switched off, and the discharge path is disconnected. After the switch-off of the MOS transistor Q2, the voltage on the sampling resistor R4 decreases, and when the voltage is lower than the internal reference voltage (0.3V) of the battery protection chip U1 again, the discharge control terminal (DO) of the battery protection chip U1 outputs the high level again, the MOS transistor Q2 is switched on, and the discharge path is conducted again. In this way, the MOS transistor Q2 operates in a state of being switched on discontinuously. It should be noted, during the switch-off of the MOS transistor Q2, since the voltage of the capacitor C7 would not become low suddenly, the MOS transistor Q3 is switched on continuously. In order to further ensure that the voltage of the capacitor C7 is greater than the gate conduction voltage of the MOS transistor Q3 during the switch-off of the MOS transistor Q2, the high voltage of the negative electrode P− of the discharge port may charge the capacitor C7 via the resistor R14 and the diode D3.

In addition, during the switch-off of the MOS transistor Q2, the voltage of the negative electrode P− of the discharge port is pulled up, and charges the capacitor C6 via the diode D1 and the resistor R8. Since the MOS transistor Q2 is switched off discontinuously during the overcurrent, the charge to the capacitor C6 is accumulated for several times. As the increase of the voltage of the capacitor C6, before the voltage reaches the conduction limiting voltage of the MOS transistor Q6, the MOS transistor Q2 operates in the state of being switched off discontinuously. If the voltage of the capacitor C6 reaches the conduction limiting voltage of the MOS transistor Q6, the MOS transistor Q6 is switched on, and the gate voltage of the MOS transistor Q3 is drawn low. Meanwhile, the resistor R5 couples the high voltage of the negative electrode P− of the discharge port with the voltage sampling terminal (VM) of the battery protection chip U1. When the voltage is greater than an internal reference voltage (0.3V), the discharge control terminal (DO) of the battery protection chip U1 outputs a low level, and the MOS transistor Q2 is switched off due to that its gate electrode loses voltage. After that, the voltage of the negative electrode P− of the discharge port is continuously applied to the voltage sampling terminal (VM) of the battery protection chip U1 via the resistor R5, such that the discharge control terminal (DO) of the battery protection chip U1 continously outputs a low voltage, the MOS transistor Q2 is locked in the switch-off state, and the discharge path of the battery is locked in the disconnected state.

Compared with the embodiments shown in FIG. 3 and FIG. 4, one comparator or amplifier may be omitted in the overcurrent protection circuit for battery discharge of the present embodiment. Furthermore, some switch transistors (such as MOS transistor Q4, Q5) may be saved in the time delay module. Thereby, the structure is simple.

As to the above-mentioned several circuit diagrams, it should be understood that they are only some embodiments of the present disclosure. In other embodiments, the MOS transistor may be replaced by other types of switch transistors, some resistors for limiting current may be omitted, and some capacitors having functions of voltage stabilization and filtering may be omitted. Moreover, a current sensor may be used to convert the current at the positive electrode of the discharge port or the negative electrode of the discharge port into voltage.

Figure 6:
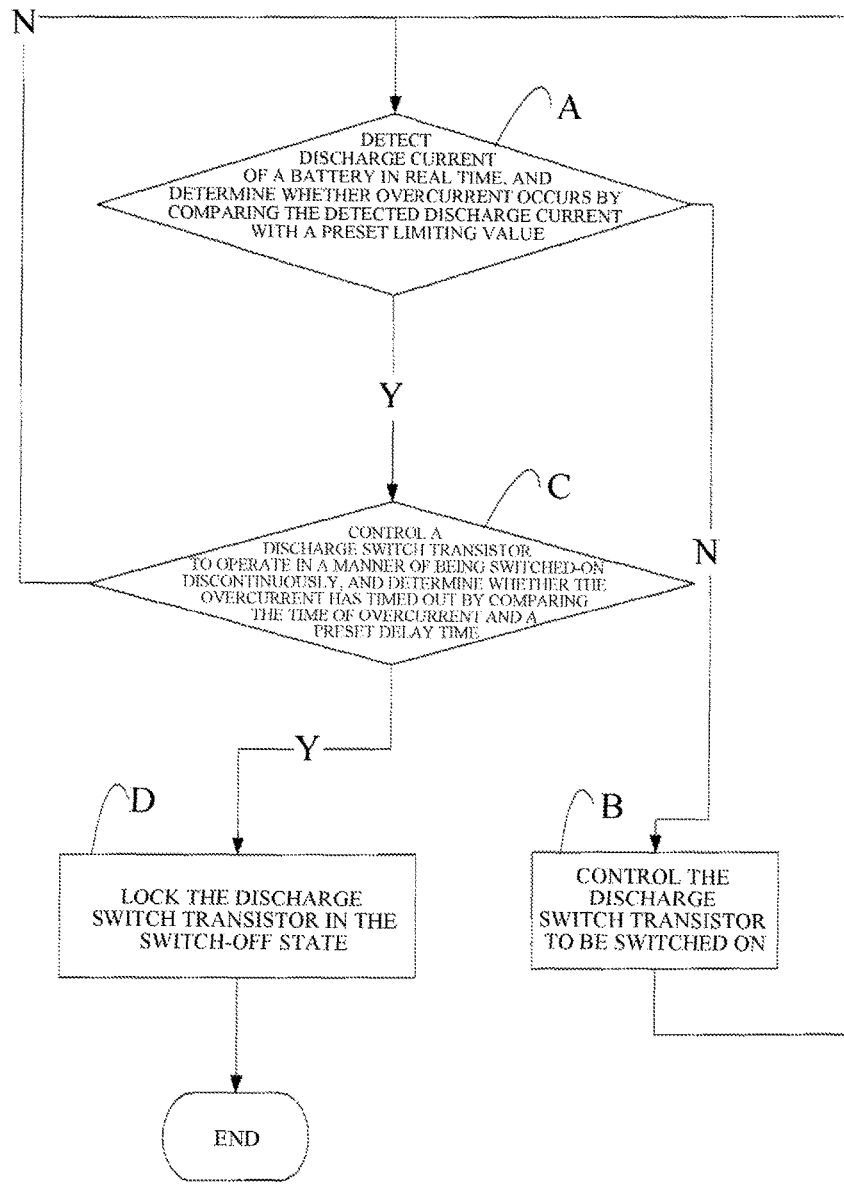
FIG. 6 is a flow chart of a first embodiment of an overcurrent protection method for battery discharge according to the present disclosure.

FIG. 6 is a flow chart of a first embodiment of an overcurrent protection method for battery discharge according to the present disclosure. The method includes:

A. detecting a discharge current of the battery in real time, and determining whether an overcurrent occurs by comparing the detected discharge current and a preset limiting value; if the overcurrent does not occur, performing step B; and if the overcurrent occurs, performing step C;

B. controlling the discharge switch transistor to be switched on, and then performing step A;

C. controlling the discharge switch transistor to be switched off, and determining whether the overcurrent has timed out by comparing the time of overcurrent and a preset delay time; if the overcurrent has timed out, performing step D; and if the overcurrent has not timed out, performing step A; and D. locking the discharge switch transistor in a switch-off state, and then ending process.

In the step C, the following method may be adopted to determine whether the overcurrent has timed out:

when the discharge switch transistor is switched off, charging a first capacitor via a second resistor by a high voltage, and determining whether the overcurrent has timed out according to the voltage of the first capacitor, wherein the preset delay time is relevant to a resistance value of the second resistor and a capacitive value of the first capacitor.

Figure 7A:
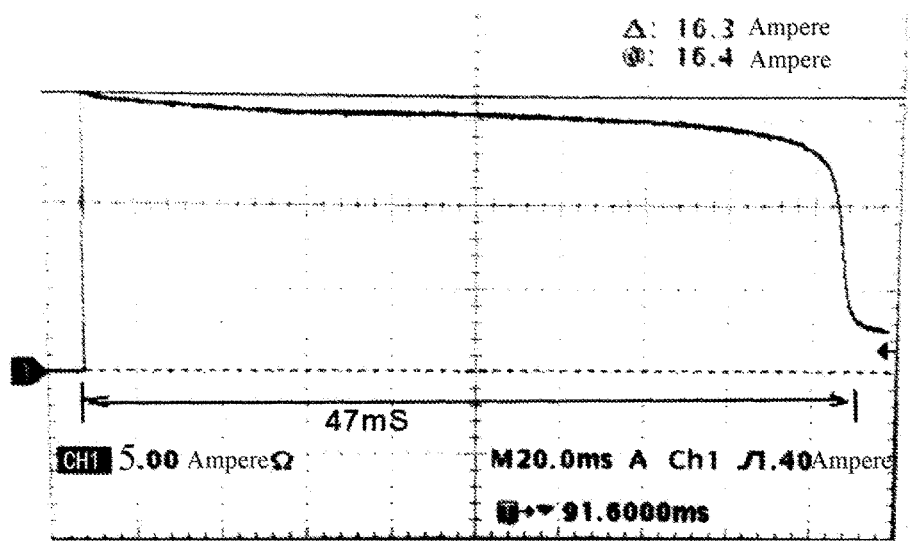
FIG. 7A and FIG. 7B are respectively waveform test charts of the discharge current of the battery according to the related art and the present disclosure.
Figure 7B:
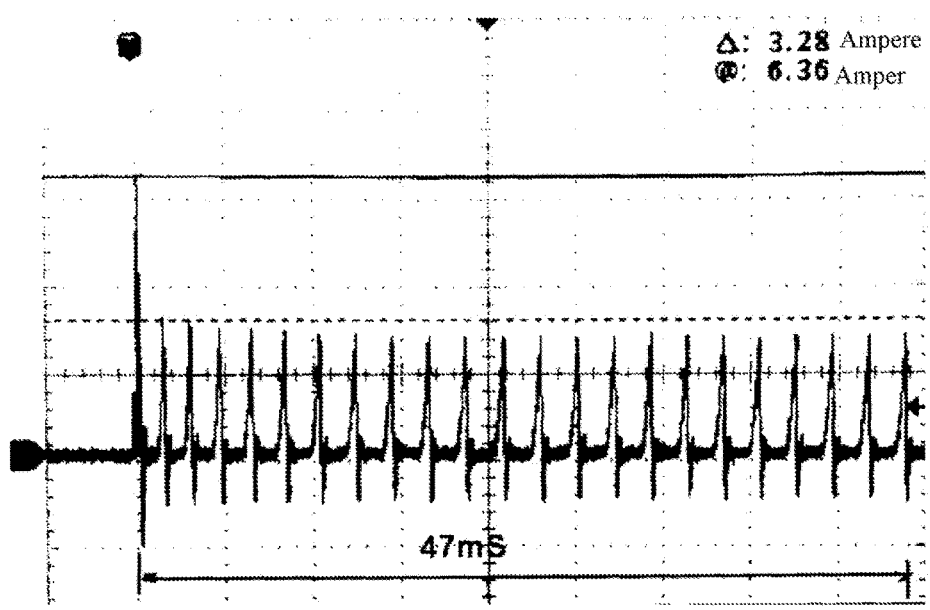

Finally, when the discharge current limiting value is 1.9 A and the delay time is 47 mS, the discharge current waveforms of the battery according to the related art and the present disclosure shown in FIG. 7A and FIG. 7B respectively are compared. In FIG. 7A, the peak of the discharge current of the battery reaches 16.4 A, and a current pulse width reaches 47 mS. In FIG. 7B, in addition to that the peak of the first pulse current is relatively high (6.36 A), the peak of the subsequent other pulse currents is about 2 A. Therefore, compared with the solution in the related art, according to the overcurrent protection solution for battery discharge of the present disclosure, the transient discharge current is greatly reduced, and the discharge energy of the battery is efficiently limited. Even though in some conditions, it is necessary to set the delay time to be relatively long (for example, considering the influence by the mechanical dithering of the pole patch of the battery at the moment of replacing the battery, it is needed to set the delay time to be 100 mS), the discharge energy of the battery would not be large.

The above-mentioned contents are only the preferable embodiments of the present disclosure, but do not restrict the present disclosure. For those skilled in the art, various modifications and changes may be made to the present disclosure. Any variations, equivalent replacements, and improvements within the spirit and principle of the present disclosure shall fall within the scope of the claims of the present disclosure.

What is claimed is:

1. An overcurrent protection circuit for battery discharge, comprising: a discharge switch transistor connected in a battery discharge path, wherein the overcurrent protection circuit further comprises:
    a discharge control module configured to detect a discharge current of a battery in real time, and determine whether an overcurrent occurs by comparing the detected discharge current with a preset limiting value, wherein if no overcurrent occurs, the discharge control module controls the discharge switch transistor to be switched on; and if the overcurrent occurs, the discharge control module controls the discharge switch transistor to operate in a manner of being switched-on discontinuously, and when the overcurrent has timed out, the discharge control module locks the discharge switch transistor in the switch-off state; and
    a time delay module configured to determine whether the overcurrent has timed out by comparing the time of the overcurrent with a preset delay time.

2. The overcurrent protection circuit for battery discharge of claim 1, wherein the discharge control module comprises a battery protection chip, a sampling resistor, a comparator, and a current limit control switch transistor, a first terminal of the sampling resistor is connected to a negative electrode of the battery and a ground, a second terminal of the sampling resistor is connected to a second terminal of the discharge switch transistor and a first input terminal of the comparator, a first terminal of the discharge switch transistor is connected to a negative electrode of a discharge port, a second input terminal of the comparator is connected to a reference voltage, an output terminal of the comparator is connected to a control terminal of the current limit control switch transistor, a second terminal of the current limit control switch transistor is connected to the ground, and a first terminal of the current limit control switch transistor is connected to a control terminal of the discharge switch transistor and a discharge control terminal of the battery protection chip.

3. The overcurrent protection circuit for battery discharge of claim 2, wherein the discharge control module further comprises a current limit resistor, a first terminal of the current limit resistor is connected to the discharge control terminal of the battery protection chip, and a second terminal of the current limit resistor is connected to the control terminal of the discharge switch transistor and the first terminal of the current limit control switch transistor.

4. The overcurrent protection circuit for battery discharge of claim 2, wherein the time delay module comprises a first diode, a first switch transistor, a second switch transistor, a first capacitor, a first resistor, a second resistor, a third resistor and a fourth resistor, a first terminal of the first switch transistor is connected to a voltage sampling terminal of the battery protection chip, a second terminal of the first switch transistor and a second terminal of the second switch transistor are connected to the ground, a control terminal of the first switch transistor and a first terminal of the second switch transistor are connected to the negative electrode of the discharge port via the first resistor, a positive electrode of the first diode is connected to the negative electrode of the discharge port, a negative electrode of the first diode is connected to a first terminal of the first capacitor and a control terminal of the second switch transistor via the second resistor, a second terminal of the first capacitor is connected to the ground, the negative electrode of the discharge port is further connected to the voltage sampling terminal of the battery protection chip via the third resistor, and the fourth resistor is connected between the negative electrode of the first diode and the ground.

5. The overcurrent protection circuit for battery discharge of claim 1, wherein the discharge control module comprises a battery protection chip, a sampling resistor, a comparator, an amplifier, and a current limit control switch transistor, a first terminal of the sampling resistor is connected to a positive electrode of the battery and a first input terminal of the amplifier, a second terminal of the sampling resistor is connected to a positive electrode of a discharge port and a second input terminal of the amplifier, an output terminal of the amplifier is connected to a first input terminal of the comparator, a second input terminal of the comparator is connected to a reference voltage, an output terminal of the comparator is connected to a control terminal of the current limit control switch transistor, a second terminal of the current limit control switch transistor is connected to the ground, a first terminal of the current limit control switch transistor is connected to a control terminal of the discharge switch transistor and a discharge control terminal of the battery protection chip, a first terminal of the discharge switch transistor is connected to a negative electrode of the discharge port, and a second terminal of the discharge switch transistor is connected to a negative electrode of the battery and the ground.

6. The overcurrent protection circuit for battery discharge of claim 5, wherein the discharge control module further comprises a current limit resistor, a first terminal of the current limit resistor is connected to the discharge control terminal of the battery protection chip, and a second terminal of the current limit resistor is connected to the control terminal of the discharge switch transistor and the first terminal of the current limit control switch transistor.

7. The overcurrent protection circuit for battery discharge of claim 5, wherein the time delay module comprises a first diode, a first switch transistor, a second switch transistor, a first capacitor, a first resistor, a second resistor, a third resistor and a fourth resistor, a first terminal of the first switch transistor is connected to a voltage sampling terminal of the battery protection chip, a second terminal of the first switch transistor and a second terminal of the second switch transistor are connected to the ground, a control terminal of the first switch transistor and a first terminal of the second switch transistor are connected to the negative electrode of the discharge port via the first resistor, a positive electrode of the first diode is connected to the negative electrode of the discharge port, a negative electrode of the first diode is connected to a first terminal of the first capacitor and a control terminal of the second switch transistor via the second resistor, a second terminal of the first capacitor is connected to the ground, the negative electrode of the discharge port is further connected to the voltage sampling terminal of the battery protection chip via the third resistor, and the fourth resistor is connected between the negative electrode of the first diode and the ground.

8. The overcurrent protection circuit for battery discharge of claim 1, wherein the discharge control module comprises a battery protection chip, a sampling resistor, a current limit control switch transistor, a fifth resistor, a sixth resistor, a second capacitor and a second diode, a first terminal of the sampling resistor is connected to a negative electrode of the battery and a ground, a second terminal of the sampling resistor is connected to a second terminal of the discharge switch transistor and a second terminal of the current limit control switch transistor, a first terminal of the discharge switch transistor is connected to a negative electrode of a discharge port, a control terminal of the discharge switch transistor is connected to a positive electrode of the second diode, a negative electrode of the second diode is connected to a discharge control terminal of the battery protection chip, the sixth resistor is connected between the positive electrode and the negative electrode of the second diode, a first terminal of the current limit control switch transistor is connected to a voltage sampling terminal of the battery protection chip, a first terminal of the fifth resistor is connected to a discharge control terminal of the battery protection chip, a second terminal of the fifth resistor is connected to a control terminal of the current limit control switch transistor and a first terminal of the second capacitor, and a second terminal of the second capacitor is connected to the ground.

9. The overcurrent protection circuit for battery discharge of claim 8, wherein the time delay module comprises a first diode, a second resistor, a third resistor, a fourth resistor, a first capacitor, and a second switch transistor, a positive electrode of the first diode is connected to a negative electrode of the discharge port, a negative electrode of the first diode is connected to a first terminal of the first capacitor and a control terminal of the second switch transistor via the second resistor, a second terminal of the first capacitor and a second terminal of the second switch transistor are connected to the ground, a first terminal of the second switch transistor is connected to the control terminal of the current limit control switch transistor, the negative electrode of the discharge port is further connected to the voltage sampling terminal of the battery protection chip via the third resistor, and the fourth resistor is connected between the negative electrode of the first diode and the ground.

10. The overcurrent protection circuit for battery discharge of claim 8, wherein the discharge control module further comprises a third diode and a seventh resistor, a negative electrode of the third diode is connected to the control terminal of the current limit control switch transistor, and a positive electrode of the third diode is connected to the negative electrode of the discharge port via the seventh resistor.

11. An overcurrent protection method for battery discharge, applied for controlling a discharge switch transistor connected in a battery discharge path, wherein when a load is connected in the battery, the method comprises:
   A. detecting a discharge current of the battery in real time, and determining whether an overcurrent occurs by comparing the detected discharge current and a preset limiting value; if the overcurrent does not occur, performing step B; and if the overcurrent occurs, performing step C;
   B. controlling the discharge switch transistor to be switched on, and then performing step A;
   C. controlling the discharge switch transistor to operate in a manner of being switched-on discontinuously, and determining whether the overcurrent has timed out by comparing the time of overcurrent and a preset delay time; if the overcurrent has timed out, performing step D; and if the overcurrent has not timed out, performing step A; and
   D. locking the discharge switch transistor in the switch-off state, and then ending process.

12. The overcurrent protection method for battery discharge of claim 11, wherein the determining whether the overcurrent has timed out by comparing the time of overcurrent and the preset delay time comprises:
   when the discharge switch transistor is switched off, charging a first capacitor via a second resistor by a high voltage, and determining whether the overcurrent has timed out according to the voltage of the first capacitor, wherein the preset delay time is relevant to a resistance value of the second resistor and a capacitive value of the first capacitor.

* * * * *